United States Patent [19]
Stefandl

[11] Patent Number: 5,898,063
[45] Date of Patent: Apr. 27, 1999

[54] CARPET RECYCLING PROCESS FOR NYLON CONTAINING CARPETING

[76] Inventor: Roland E. Stefandl, 62 Cider Hill, Upper Saddle River, N.J. 07458

[21] Appl. No.: 08/802,202

[22] Filed: Feb. 18, 1997

[51] Int. Cl.⁶ ..................................................... C08F 6/00
[52] U.S. Cl. ........................ 528/480; 528/491; 528/495; 528/503
[58] Field of Search ................................. 528/480, 491, 528/495, 503

[56] References Cited

U.S. PATENT DOCUMENTS

| | | |
|---|---|---|
| 3,006,867 | 10/1961 | Simon et al. . |
| 3,696,058 | 10/1972 | Teti et al. . |
| 4,003,880 | 1/1977 | Sidebotham et al. . |
| 4,003,881 | 1/1977 | Sidebotham et al. . |
| 4,064,079 | 12/1977 | Sidebotham et al. . |
| 4,118,187 | 10/1978 | Sidebotham et al. . |
| 4,137,393 | 1/1979 | Sidebotham et al. . |
| 5,198,471 | 3/1993 | Nauman et al. . |
| 5,240,530 | 8/1993 | Fink . |
| 5,288,349 | 2/1994 | Fink . |
| 5,294,384 | 3/1994 | David et al. . |
| 5,342,854 | 8/1994 | Serad . |
| 5,370,757 | 12/1994 | Corbin et al. . |

*Primary Examiner*—P. Hampton-Hightower
*Attorney, Agent, or Firm*—Banner & Witcoff, Ltd.

[57] ABSTRACT

This invention comprises recycling and recovery processes for rugs, flooring, carpeting, carpet materials, and all other textiles particularly from waste carpet containing both synthetic and natural fibers and for backing materials, and more particularly for the separation and recovery of various nylon polymers as well as other polymeric fibers and materials for recovery and reuse.

18 Claims, No Drawings

CARPET RECYCLING PROCESS FOR NYLON CONTAINING CARPETING

FIELD OF THE INVENTION

The invention comprises methods and processes for recycling nylon containing carpeting which includes stepwise separation using a combination of selective solvent or solvents and temperatures control methods. The steps include but are not limited to:

a. reduce carpet size to granular form;
b. wash and/or filter as necessary to remove inert solids, dirt and fillers; and
c. stepwise separation of backing, adhesive and various types of fibers.

BACKGROUND OF THE INVENTION

The use of synthetic fibers has increased in many areas of technology. Among those areas which has had a very great and varied increase is carpets, area rugs, carpeting and include all types of floor coverings. The teachings and publications in this and related fields are quite extensive and describe details for separating, reconstituting, recovering, purifying and variously treating and handling used textiles and carpeting and include natural and synthetic fibers in the processing and recovery steps.

More specifically, U.S. Pat. No. 3,006,867 (Simon) discloses a method of reconstituting a synthetic plastic, such as and including nylon from waste and used materials and include textile wastes having nylon fibers. The method consists of dissolving the waste material from the synthetic plastic in formic acid, mixing a hydrocarbon selected from n-hexane, cyclohexene, n-heptane, cyclohexane, hexene, benzene, and toluene with the formic acid-plastic solution in an amount sufficient to form an azeotropic mixture, then heating the azeotropic mixture to a temperature sufficient to vaporize the azeotropic mixture and removing (recovering) the vapors from the distillation zone to leave behind the desired synthetic plastic being recovered.

U.S. Pat. Nos. 4,003,880; 4,003,881; 4,118,187 and 4,137,393 (Sidebotham et al) variously disclose methods for recovering polyester from dyed polyester fibers as in fabrics, textiles, carpeting and commercial products. Only polyesters are involved in the recovery steps. While the conditions and procedural steps vary in the patent disclosures, there are certain steps which are described in and utilized in all these patent processes. These steps generally include:

1. contacting collections of yarns, fibers, and fabrics, including dyed polyester fibers with a dye-stripping solvent for polyester polymer which is preferably not a solvent for the remaining constituents at a temperature below which the polyester fiber dissolves and above the crystal lattice of the polyester fibers swell to as to release the dye, thereby stripping the dye from the polyester fibers;
2. removing the excess of the dye-containing dye-stripping solvent which is not absorbed by the fibers and fabrics;
3. contacting the fibers (which many contain residual dye-stripping solvent) with sufficient addition of a primary dissolution solvent under selective dissolution conditions for polyester fibers;
4. removing the undissolved fibers or the other impurities from the solution; and
5. separating the solvent or solvents from the polyester by evaporating the solvent from the dissolved and/or molten polyester without precipitating the polyester from solution.

It is significant and important to point out that none of these recovery methods disclose or suggest any steps or detailed recovery procedures for nylon. Rather, they are limited to specific dissolution techniques for recovery of the unrelated polymer, polyester. In another U.S. Pat. No. 4,064,079 (Sidebotham et al) a modified polyester recovery method is disclosed which does not include a step for removal of dye from the polyester fibers.

U.S. Pat. No. 5,240,530 and 5,288,349 (Fink) teach a carpet recycling and recovery method in which portions of the carpet are initially ground and melted for a feedstock. Carpets containing different types of materials are ground mechanically so that the contained fiber length is reduced between $\frac{1}{4}$" and $\frac{1}{16}$". These fibers are then separated in an aqueous bath on the basis of specific gravity. Neither of these patents teach or suggest separating nylon fibers from polyester fibers by subjecting the mixed fibers to water and then heat, that is, there are no extraction steps disclosed.

U.S. Pat. No. 5,294,384 (David et al) discloses a method for converting waste carpet material into a thermoplastic composition. As starting material, the carpet samples (waste) may have any pile weight and also may be comprised of non-homogeneous mixtures of components. The samples are melt blended with or without a compatibilizer in a temperature range of from 250 degrees Celsius to about 260 degree Celsius and at a pressure of from about 350 to 450 psi and a shear rate of about 200–400/sec.; most preferably this step is carried out in a twin screw extruder. The blends thus formed may then be palletized or processed into other commercially acceptable forms. Blend compositions which are disclosed include mixtures of nylon, polyolefins, SBR latex, and inorganic fiber. Using the method described in this patent no attempt is made (no steps included) to separate the fiber mixture into their consistent parts or fractions; rather, the mixtures are merely transformed into a different mixture having a different form from the starting components.

In U.S. Pat. No. 5,370,757 (Corbin et al) a carpet product is disclosed which has two distinct sections, a top section constructed entirely from nylon (Nylon 6) and a bottom section. The top section is thus easily removable from the bottom section for replacement thereof without any damage to the bottom section. After such removal, the top section can then be recycled to e-Caprolactum for re-use in Nylon 6 carpet or it can be used in other Nylon 6 products.

Further, U.S. Pat. No. 5,342,854 (Serod) describes a method for separating and recovering polyester from polyester/cotton blends. The polyester/cotton materials is cut and chopped into small pieces and then dried. These dried scraps are placed into a vessel containing a sulfone solvent such as an alkyl sulfone having from 1 to 10 carbon atoms and heated to 150 degrees Celsius. This mixture is steeped (with agitation) for about 90 minutes at this temperature. Thereafter, the temperature of the mixture is raised to 190 degrees Celsius and maintained thus for about another 35 minutes. The solvent containing polyester is then separated for further treatment to precipitate the recovered polyester. There are no methods or steps described for separating the polyester from any other polymeric systems or other polymeric fibers.

U.S. Pat. No. 5,198,471 does not teach a process related to this invention. There is no disclosure of nylon fibers, carpet, or any of the solvents. In U.S. Pat. No. 3,696,058 (Tate) a process is disclosed for recovering solid scrap thermoplastic polymers such as polyamides and polyesters. The process comprises the following steps:

a. dissolving said thermoplastic polymer in hexafluorisopropanol;

b. filtering said polymer solution;

c. mixing the polymer solution with an excess of water at temperature of from 60 to 100 degrees Celsius; and d. separating the precipitated polymer from the water, wherein the thermoplastic polymer is selected from the group consisting of polyamide, polyester, polyacrylonitrile and polyacetal.

In this patent the solvents employed for the polymer are fluoroalcohols. It has been known to use formic acid and sulfuric acid as well as various types of solvents such as for instance ethylene glycol, propylene glycol, meta-cresol and various tri-glycerides and fatty acids to dissolve nylons polymeric materials as a step in producing cast polyamide fibers including nylon fibers.

SUMMARY OF THE INVENTION

It is an objective of this invention to provide a recycling process for carpeting material containing nylon polymers and/or nylon fibers.

It is also an objective to describe processes for separating and recovering plastic and polymer components of carpeting, used carpets, carpets scraps and the like including mixtures of synthetic carpeting materials one or more components or portions of which contain nylon. Another objective is to provide an economical, practical and environmentally acceptable method for recovery of components from carpeting materials containing nylon polymers.

Another specific objective is to recover Nylon 6 and Nylon 6,6 from nylon containing carpet scraps and used carpeting.

A further object is to separate and recover nylon polymer from carpeting containing other polymers such as polyesters, polyamides, P.E.T. (poly-ethylene terepthtalate) and other polymers as well as natural fibers.

Another object is to provide an efficient recycling process for nylon containing carpeting materials or any other material containing nylon. Other objectives will be disclosed in the detailed description of the invention process described herein below.

DESCRIPTION OF THE INVENTION

At present there are a number of different but related reasons and objectives which make carpet recycling of prime importance.

There are both environmental and economic reasons for the drive with respect to recycling processes and methods. Practical and economic values are advantageous for limiting landfill usage for the old and discarded carpeting as well as otherwise useless carpeting scraps.

Recycling generally can include methods for reprocessing or reconditioning for reuse as such, conversion of the carpeting or the components thereof into a new or different product which may have a different and often less demanding or more generic application, or use of one or more processes or process steps in a way which recovers all or part of the value of the components.

In the processes of this invention, a number of these advantages and objectives are achieved.

This invention broadly relates to the recycling and recovery of products from carpeting in which the fibers contain at least substantial quantities of nylon as well as polyester and P.E.T. (poly-ethylene terephthalate). In addition, acrylic fibers may be present as well as various olefinic resins. Also, in some instances, natural fibers such as cotton and/or wood may also be present.

The carpeting, which is subjected to recycling, also has a backing material which may be for instance polypropylene, polyethylene, acrylic resin, a straw-burlap material known commercially as "JUTE", a mixture of these with possibly other materials in smaller amounts.

It is also commonly required that some kind of "gluing" agent or adhesive be present at least in a minor amount in order to attach and securely bind the fibers to the backing. The adhesive during the recovery process becomes part of the inert by-product stream and thus remains a part of the inert fraction.

The process of this invention can be advantageously and quite satisfactorily practiced with any carpet as the starting material, provided only that there is some nylon fibers present. The nylon can be of the type known commercially as Nylon 6 (poly-6-aminocaproic acid), Nylon 6,6 (poly-hexamethyleneadipamide), Nylon 8 (poly-8-aminocaprylic acid), Nylon 11 (poly-11-aminoundecanoic acid), and Nylon 6,10 (polyhexamethylene sebacamide).

It is not necessary, or at least not practical or highly effective to separate the carpet fibers from the backing that is, because the release of the adhesive from the fibers during the recovery step are effectively accomplished. It is not generally necessary to remove the adhesive as whatever remains with the fiber will remain as a solid residue in the separation step.

In one embodiment of the invention, the ground carpeting, preferably primarily comprising the nylon containing fibers are admixed with a selective solvent. This solvent must be appropriately selected and is preferred to be a glycolic compound (polyhydric alcohol) such as ethylene glycol or propylene glycol or glycerol and can also be various mixtures of these solvents. This solvent may also be an organic formate, such as methyl or ethyl formate, hydrochloric acid, formic acid, methanol, nitric acid, glacial acetic acid, fluorinated alcohols, m-cresol, phenolic compounds, chloroform-methanol, methanol-lithium chloride, potassium thiocyanate, benzyl alcohol, butane diol 1,1, dimethyl sulfoxide, triethylene glycol, and tetraethylene glycol.

It has been found by actual testing and experimentation that glycerol is the most effective solvent and is preferred for isolation and recovery of the nylon components in the fibers. It is found to be the most environmentally friendly solvent of those listed.

The basis for the separation of the types of nylon fractions (Nylon 6 and Nylon 6,6) is the relative solubility of the two types in the solvent depending on the temperature. Thus, the different types can be identified, separated and removed by varying the temperature. The Nylon 6 fraction is soluble in glycerol at 155 degrees Celsius whereas the Nylon 6,6 is soluble at 195 degrees Celsius, all the nylon polymers will be dissolved. Then the mixture is cooled and the Nylon 6,6 will not be soluble and can be separated and removed as a solid. Further cooling to about 150 degrees Celsius will cause the Nylon 6 to separate and it can be removed as a solid.

The process can also be carried out by selective heating of the fibers in solution. At a temperature of about 150 degrees Celsius and the Nylon 6 will be dissolved and can then be separated with the glycerol and the Nylon 6,6 is thus the remaining solid which has not been heated to a sufficiently high temperature to dissolve.

The nylon which is recovered as a solution in glycerol or other organic solvent can be easily recovered by precipitation upon cooling followed by washing with water where as the solid nylon polymer separates from the liquid solution.

The many advantages include the ability to separate the nylon polymers from other polymers, adhesives and fibers, using a safe environmentally acceptable steps to recover clean, relatively pure nylon polymers. Although advantage is that there is a relatively simple, economical and effective step which is readily included to separate Nylon 6 and Nylon 6,6 and recover both in a pure form.

The following Examples are typical processes for the recovery of the products according to the invention but are in no way intended to limit the invention process and products thereto.

EXAMPLES

Example 1

This process and the steps thereof relate to the recovery of nylon, particularly Nylon 6,6 both from home and commercial carpets. Carpet containing Nylon 6,6 is dissolved in a hot, highly pure glycerol at elevated temperatures. At high temperatures, nylon oxidizes with oxygen and/or hydrolysis with water. To prevent oxidation various stabilizers may be added to the solvent. Alternatively, working under a nitrogen environment renders an effective protection against nylon degradation from both oxidation and hydrolysis.

Upon dissolution, the solution is quickly withdrawn to a dry vessel where it is quickly cooled to 40 degrees Celsius or lower. The solution is washed with water to remove traces of glycerol, then filtered, and lastly dried under vacuum at 40 to 60 degrees Celsius to recover the nylon polymer. The following is an example of the method used in practicing this recovery and recycling process:

1. 1200 ml of pure glycerol is heated to and maintained at 205 C. and 1 ATM. of pressure in a stirrer equipped vessel where it is uniformly stirred at a moderate speed.
2. Meanwhile, a constant stream of nitrogen gas is applied to the solvent as it heats up to purge out any residual oxygen.
3. 100 grams of Dupont Stainmaster carpet is added to the hot solvent.
4. The initial carpet fiber is sample and found to be Nylon 6 with a relative viscosity of 1.7.
5. 15 minutes after all the nylon is dissolved, the solution is pumped out of the heating vessel via a heated 0.25 inch diameter stainless steel pipe into a dry flask that is sitting in an ice bath.
6. When the solution cools down to 40 C. or below it is washed with water at a ratio of 20:1 by volume and filtered, for the final wash.
7. For the final wash potassium iodine (KI) is added to the water as a heat stabilizer for future processing.
8. The final solution is filtered and the cake is dried in an oven purged with nitrogen then under vacuum allowed to dry at 45 C. for three days.
9. The final material is checked for its purity and relative viscosity (RV). The final material exhibited an increase in relative viscosity to 2.21.

Example 2

This process and the steps thereof relate to the recovery of Nylon 6 and Nylon 6,6 both from home and commercial carpets.

Carpet containing Nylon 6 and Nylon 6,6 is dissolved in a hot, highly pure glycerol at elevated temperatures. To prevent oxidation stabilizers are added to the solvent. Alternatively, working under a nitrogen environment renders an effective protection against nylon degradation. Upon dissolution at 165 C., the solution containing Nylon 6 is quickly withdrawn to a dry vessel while the undissolved residue containing Nylon 6,6 is dissolved in a second vessel at 200 C. and withdrawn into its dry clean vessel. The two nylon containing vessels are cooled quickly to 40 C. The solid particles are washed independently of each other to remove any trace of glycerol. The polymer is then filtered and dried under vacuum at 40 to 60 C. to recover the pure nylon polymer. The polymer is then checked for relative viscosity and purity using differential scanning calorimetry. The Nylon 6,6 and Nylon 6 exhibited a single melting peak confirming the melting point of the pure components proving the polymer separation was performed accurately.

I claim:

1. Process for separating nylon from nylon-containing carpeting comprising dissolving the nylon in the carpeting in a solvent at at least the dissolution temperature of the nylon in the solvent, removing the solvent containing the dissolved nylon from remaining solid residue, and cooling the solvent-nylon solution to precipitate and recover the nylon.

2. The process of claim 1 wherein at least two types of nylon are present in the carpeting, wherein only a first type of nylon is initially recovered by dissolving the first type of nylon in a solvent at at least the dissolution temperature of the first type of nylon in the solvent, but below the dissolution temperature of remaining types of nylon, removing the solvent containing the dissolved first type nylon from any remaining solid residue, and repeating the dissolution for each of the remaining types of nylon.

3. The process of claim 1 wherein at least two types of nylon are present in the carpeting wherein the at least two types of nylon are dissolved in a solvent at at least a temperature wherein all the types of nylon are dissolved; cooling the solvent to a temperature for which one type of nylon precipitates out, but above the dissolution temperature of the remaining types of nylon; removing the precipitate; and then cooling the solvent to a temperature for which another type of nylon precipitates out and repeating the removal of precipitate and cooling steps until all types of nylon have been precipitated.

4. The process of claim 2 wherein two types of nylon are present in the carpeting.

5. The process of claim 4 wherein the two types of nylon are Nylon 6 and Nylon 6,6.

6. The process of claim 3 wherein two types of nylon are present in the carpeting.

7. The process of claim 6 wherein the two types of nylon are Nylon 6 and Nylon 6,6.

8. The process of claim 1 further comprising reducing the carpeting to granular particulate form prior to dissolving the nylon.

9. The process of claim 8 further comprising separating inert solids and non-fibrous fillers from the carpet prior to dissolving the nylon.

10. The process of claim 1 wherein the carpeting contains at least one other fiber.

11. The process of claim 10 wherein the at least one other fiber comprises a synthetic polymer fiber.

12. The process of claim 11 wherein the at least one other fiber is a polyester.

13. The process of claim 11 wherein the at least one other fiber is a polyamide.

14. The process of claim 11 wherein the at least one other fiber is a terephthalate polymer.

15. The process of claim 11 wherein the at least one other fiber comprises a natural fiber.

16. The process of claim 11 wherein the solvent is glycerol.

17. The process of claim 11 wherein the solvent is ethylene glycol.

18. The process of claim 1 wherein the solvent is propylene glycol.

* * * * *